Patented Mar. 14, 1933

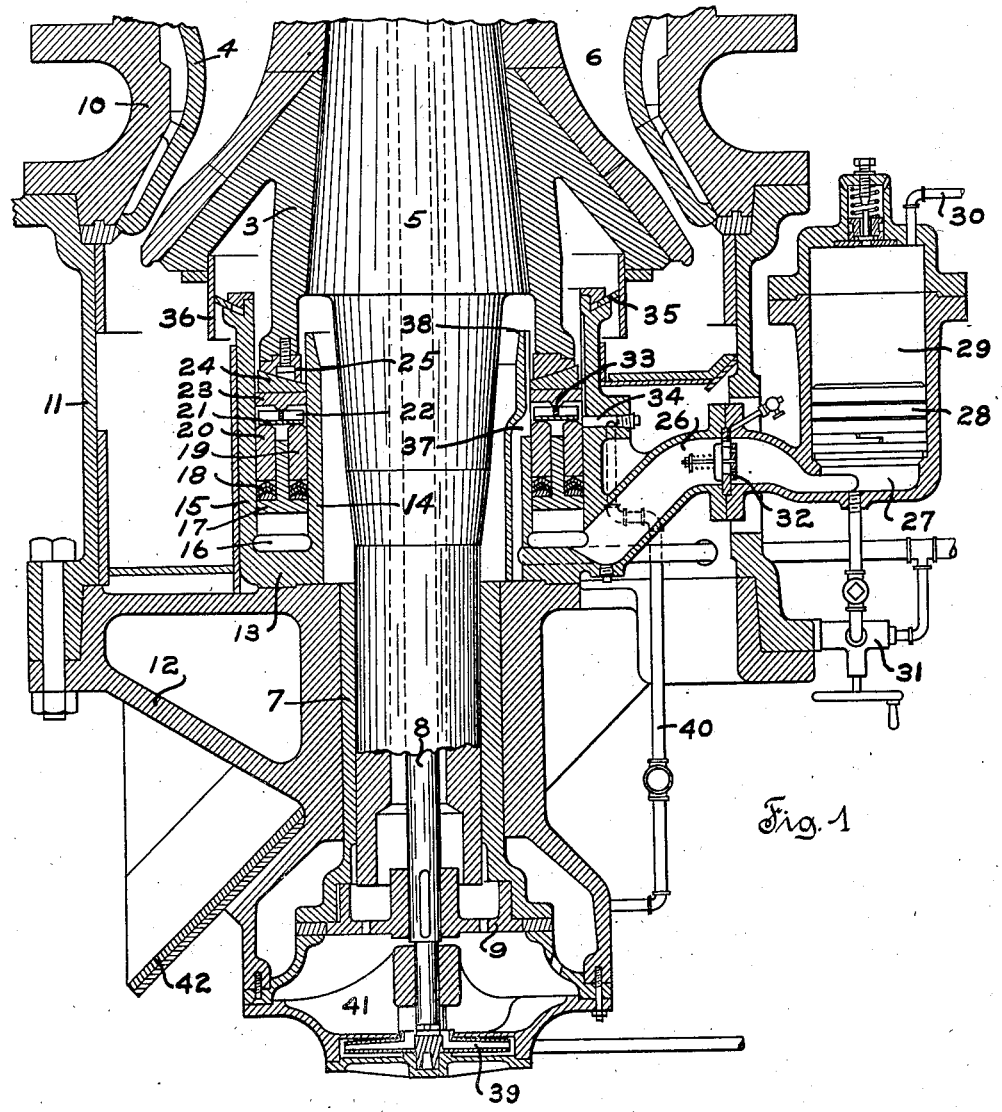
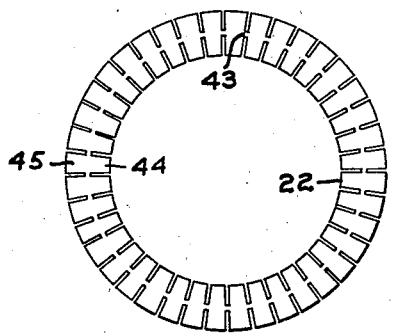

1,901,722

UNITED STATES PATENT OFFICE

GEORGE D. BECKER, OF WEST ALLIS, AND RAY C. NEWHOUSE, OF WAUWATOSA, WISCONSIN, ASSIGNORS TO ALLIS-CHALMERS MANUFACTURING COMPANY, OF MILWAUKEE, WISCONSIN, A CORPORATION OF DELAWARE

PACKING STRUCTURE

Application filed July 2, 1930. Serial No. 465,268.

The present invention relates in general to improvements in the art of packing, and relates more specifically to improvements in the construction and operation of packing devices especially adapted to seal joints between relatively reciprocable elements.

An object of the invention is to provide an improved packing wherein the pressure on a plurality of sealing elements may be automatically equalized. Another object of the invention is to provide improved means for sealing the joint between coacting relatively movable elements, against escape of high pressure fluid. A further object of the invention is to provide an improved packing for simultaneously sealing the joint between sets of coacting surfaces disposed at remotely spaced portions of an element. Still another object of the invention is to provide a packing structure especially applicable to thrust bearings of the type comprising a confined fluid body adapted to resist the thrust reaction. A further object of the invention is to provide an improved packing device for the reaction bearings of gyratory crushers or the like. These and other objects will be apparent from the following detail description.

Some of the novel features of crusher and thrust bearing construction, disclosed but not specifically claimed herein, form the subject of copending application Ser. No. 588,401, filed September 15, 1922, Ser. No. 757,309, filed December 22, 1924, Ser. No. 452,864, filed May 16, 1930, and Ser. No. 459,941, filed June 9, 1930.

A clear conception of an embodiment of the invention and of the mode of constructing and of manipulating packings built in accordance therewith, may be had by referring to the drawing accompanying and forming a part of this specification in which like reference characters designate the same or similar parts in the several views.

Fig. 1 is a fragmentary central vertical section through a gyratory crusher having a thrust bearing embodying the improved packing structure.

Fig. 2 is a plan view of the annular equalizer constituting a part of the improved packing structure.

The gyratory crusher specifically shown in the drawing by way of illustration of a commercial application of the present invention, comprises generally an inner movable conical member or head 3; an outer fixed annular member or concave 4 surrounding and cooperating with the inner member 3 to form an annular crushing chamber 6; a main shaft 5 rigidly attached to the inner member 3; a rotary eccentric 7 cooperating with the lower extremity of the shaft 5 and operable at high speed to impart rapid gyratory motion to the inner member 3; a central driving shaft 8 located within the main shaft 5 and rigidly connected with the lower extremity of the eccentric 7 by means of a drive plate 9; and suitable frame strurture for supporting the crushing and driving elements.

The outer member 4 is fixedly supported directly within an annular upper frame 10, and is supported upon the upper extremity of an intermediate frame 11 which in turn rests upon and is attached to a lower frame 12, these frames being provided with a discharge chute 42 below the crusher discharge. The lower frame 12 besides providing a guide bearing for the eccentric 7, constitutes a support for a thrust bearing casing 13 having inner and outer walls 14, 15 respectively which cooperate to form an annular recess having an annular oil confining space 16 in the lower end thereof. An annular plunger 17 rests upon the oil within the space 16 and has an annular upwardly extending projection on the opposite sides of which annular packings 18 are disposed. The annular space 16 communicates with an oil confining passage 26 which in turn communicates past a check valve 32 with a displacement chamber 27, the space 16, passage 26 and space 27 cooperating to confine the oil body against which the plunger 17 reacts.

The check valve 32 is provided with relatively small holes for permitting slow return of oil from the chamber 27 through the passage 26 to the space 16, after displacement of oil from the space 16 by the plunger 17. A piston 28 coacts with its lower surface against the oil in the chamber 27, and has its upper face exposed to an elastic fluid confining chamber 29 to which elastic fluid under any desired pressure may be admitted through a pipe 30. An oil supply pump 31 is adapted to admit oil to the confined body within the chamber 27, passage 26 and space 16, in order to vary the vertical position of the plunger 17 within the annular recess of the casing 13, and the discharge line of the pump 31 may also be provided with means for draining oil from the confined body. Such drainage may, however, also be effected by means of a removable plug in the passage 26, or otherwise.

Coacting with the inner of the annular packings 18 is a compression ring 19, and a similar compression ring 20 coacts with the outer of the packings 18. Coacting with the uppermost extremities of the rings 19, 20 above the upwardly extending projection of the plunger 17, is a flexible flat ring 21 formed of sheet metal or other readily deflectable material, this ring however being imperforate. Disposed directly above the ring 21 is an equalizer ring 22 having a solid annular central portion 43 and deflectable fingers 44, 45 radiating inwardly and outwardly respectively from the solid portion, as shown in Fig. 2.

An upper annular plunger element 23 has a central downwardly extending annualr projection 33 which rests upon the solid central portion 43 of the equalizer ring 22, and has a plane upper surface. The equalizer ring 22 and the deflectable plate 21 cooperate to form an equalizer which together with the annular element 23 having the projection 33, functions to equalize the pressures on the inner and outer packings through rings 19, 20. A floating thrust ring 24 rests upon the upper surface of the element 23 and is freely slidable thereon both circumferentially and radially. The lower portion of the inner crushing member 3 is provided with a bearing ring 25 which coacts directly with the upper surface of the floating thrust ring 24 along a spherical zone surface having its generating center above the crushing chamber. The entire plunger structure including the plunger 17 and the elements coacting therewith, together with the bearing ring 25 of the head 3, are confined within the annular recess between the inner and outer walls 14, 15 of the casing 13, and a dust seal comprising a laterally movable ring 35 and an annular apron 36 cooperating therewith, serves to prevent ingress of dust to the bearing structure.

The thrust bearing structure is normally lubricated by means of oil admitted to the bearing elements through a conduit 37 formed in the inner wall 14, and the eccentric 7 disposed beneath the thrust bearing structure receives oil from within the thrust rings 24, 25 over the upper extremity 38 of the inner wall 14. The oil thus delivered over the upper extremity 38 of the inner wall serves to lubricate the eccentric 7 and is eventually received in a collecting chamber 41 and is delivered therefrom to a centrifugal pump 39 which returns the lubricating oil to the source of supply leading to the conduit 37. While it is normally contemplated to prevent free flow of oil from the interior of the thrust bearing to the exterior thereof, slight quantities of oil may leak laterally through the bearing, and this leakage is conducted through a passage 34 and a drain pipe 40 to the collecting chamber 41 in an obvious manner.

During normal operation of the crusher, the eccentric 7 is being rotated at high speed to gyrate the main shaft 5 and the inner crushing member 3, relatively to the fixed outer crushing member 4, thereby reducing material fed by gravity through the crushing chamber 6. The crusher structure is being lubricated by the centrifugal pump 39 and the oil flowing through the conduit 37 and over the upper extremity 38 of the inner wall 14, and the downward reaction resulting from crushing is transmitted from the inner member 3 through the plunger structure to the oil body confined within the space 16, passage 26 and chamber 27. The fluid pressure established within the chamber 29 is sufficient to normally resist displacement of the piston 28 and of the confined oil body.

In case a piece of abnormally hard material is admitted to the crushing chamber 6, the excessive downward pressure upon the inner crushing member 3 is quickly transmitted through the thrust ring 24, element 23, equalizer ring 22, deflectable ring 21, rings 19, 20, packings 18, and plunger 17 to the oil confined within the space 16, thereby causing displacement of oil from the space 16 through the passage 26 to the chamber 27. As the displaced oil enters the chamber 27, the piston 28 is raised against the elastic fluid pressure in the chamber 29, thus causing the inner crushing member 3 to move away from the outer crushing member 4, and thereby permitting the obstruction to pass through the discharge opening of the crusher and to be delivered to the discharge chute 42. Upon passage of the obstruction through the crusher discharge, the elastic fluid within the chamber 29 becomes effective to return the crushing member 3 to normal position, the rate of return to normal, however, being retarded by the small openings in the check valve 32.

If it becomes desirable to vary the position of the inner crushing member 3 relatively to the outer crushing member 4, it is only necessary to vary the quantity of oil confined within the space 16, passage 26 and chamber 27. By admitting more oil to the body, the head 3 will be raised, whereas withdrawal of oil from the body will lower the member 3. The fixed position of the member 3 is, however, determined merely by the quantity of oil within the confined oil body, and is not dependent upon the pressure existing in the chamber 29. When no crushing is being done, the pressure within the confined oil body is determined by the weight of the inner crushing member 3, of the shaft 5 and of the thrust bearing elements, and it is only during crushing that the pressure within the confined oil body exceeds the pressure due to the weight of these parts.

When pressure is applied to the floating thrust ring 24, such pressure is immediately transmitted through the element 23 to the equalizer comprising the rings 22, 21. The downward pressure transmitted to the packings 18 through the rings 19, 20, is automatically equalized by the resilient fingers 44, 45 of the equalizer ring 22. The flexible imperforate plate 21 functions merely to prevent free passage of lubricating oil from within the bearing structure to the exterior thereof, and the projection 33 on the element 23 coacting with the solid annular portion 43 of the equalizer ring 22 whereby the ring 22 may carry out its equalizing function, performs a function similar to that stated for the inperforate plate 21.

From the foregoing description it must be apparent that the equalizer functions to automatically maintain equal pressures on the distortable packings 18 located on opposite sides of the central projection of the plunger 17, thereby insuring equal sealing effect both internally and externally of the plunger structure. The formation of the element 23 and of the equalizer structure is moreover such that free flow of lubricating oil from the interior to the exterior of the thrust bearing is avoided, and any slight leakage which may occur is quickly removed by the drain 40, thereby preventing oil from reaching the dust seal at the top of the outer wall 15. While the improved packing structure is well adapted for the purpose shown and described herein, it will be apparent that the novel features are more generally applicable to packings for various machines, and it is not desired to restrict the present invention by the specific disclosure herein.

It should also be understood that it is not desired to limit the invention to the precise details of construction of the packing device shown and described herein, for various modifications in such structures, within the scope of the claims, may occur to persons skilled in the art.

It is claimed and desired to secure by Letters Patent:

1. In combination, an annular plunger having segregated, radially spaced annular packings, a rigid ring coacting with each of said packings, and means for applying equal pressures to both of said packings through said rings.

2. In combination, an annular plunger having a central annular projection and segregated packings on opposite sides of said projection, a rigid ring coacting with each of said packings, and mechanism disposed beyond the end of said projection and coacting with said rings to equalize the pressures of one packing to those of the packing at the other side.

3. In combination, a circular plunger having a concentric annular projection and distortable packings on opposite sides of said projection, a ring coacting with each of said packings, and mechanism disposed remote from said plunger and beyond the end of said projection for equalizing the pressure of one packing to that of the packing at the other side.

4. In combination, means forming an annular recess, a plunger movable within said recess, a packing carried by said plunger and coacting with the inner wall of said recess, a packing carried by said plunger and coacting with the outer wall of said recess, and mechanism for equalizing the pressures on one packing to those on the packing at the other wall.

5. In combination, a casing, a plunger movable within said casing, inner and outer packings carried by said plunger, a ring coacting with each of said packings, said rings being movable axially of said plunger, an equalizer coacting with both of said rings, and means for applying pressure to said equalizer in a manner to effect equalization of pressures on said packings so that the pressures acting on said packings are the same.

6. In combination, a circular plunger having a concentric annular projection and inner and outer packings on opposite sides of said projection, a compression member coacting with each of said packings, an equalizer coacting with both of said compression members beyond the end of said projection, and means for applying pressure to said equalizer in a manner to effect equalization of pressures on said packings through said members so that the pressures acting on said packings, are the same.

7. In combination, means forming an annular recess, a plunger movable within said recess, segregated packings carried by said plunger in contact with the walls of said recess, a packing compression member coacting with each of said packings, an equalizer coacting with both of said compression members, an element having a local projection coacting with said equalizer, and means for applying pressure to said element.

8. In combination, a casing having an annular recess, a plunger movable in said recess, inner and outer packings carried by said plunger, a compression ring coacting with each of said packings, an annular equalizer coacting with both of said compression rings, a ring element having a central annular projection coacting with said equalizer, and means for applying pressure to said element.

9. In combination, a casing, a plunger movable along said casing, segregated packings carried by said plunger, a ring coacting with each of said packings, an equalizer having spaced portions coacting with said rings, an element having a projection engaging said equalizer between said spaced portions, and means for applying pressure to said element.

10. In combination, a casing, a plunger movable along said casing, segregated packings carried by said plunger, independent rings coacting with said packings, an equalizer having spaced series of fingers coacting with said rings, an element having a projection on one side thereof coacting with said equalizer between said series of fingers, and means for applying pressure to the opposite side of said element.

11. In combination, a casing having a fluid body confined therein, a plunger reacting against said body and having packings coacting with said casing to prevent escape of fluid from said body, segregated rings coacting with said packings, an equalizer having spaced portions coacting with said rings, an element having a local projection coacting with said equalizer between said spaced portions, and means for applying pressure to a portion of said element remote from said projection.

12. In combination, a casing having an annular space within which a fluid body is confined, an annular plunger reacting against said body and having inner and outer packings coacting with said casing to prevent escape of fluid from said body along said casing, a ring coacting with each of said packings, an annular equalizer having inner and outer flexible portions coacting with said rings, an element having an annular projection on one side thereof coacting with said equalizer between said portions, and means for applying pressure to the opposite side of said element.

13. In combination, a casing having a confined fluid body therein, an annular plunger reacting against said body, inner and outer concentric annular packings for preventing escape of fluid from said body between said casing and said plunger, rings coacting with said packings, an annular equalizer having inner and outer flexible portions coacting with said rings, an element having an annular projection on one side thereof coacting with said equalizer between said portions, and means for applying pressure to the opposite side of said element.

14. In combination, a casing having a recess, a plunger movable in said recess, packings carried by said plunger, equalizing mechanism coacting with said packings and maintaining equal pressures on said packings, said mechanism being formed to prevent free flow of fluid therethrough, and means for applying pressure to said packings through said mechanism.

15. In combination, a casing having an annular recess therein, a plunger movable in said recess, inner and outer packings carried by said plunger, an annular equalizer having inner and outer flexible portions coacting with said packings respectively, means between said equalizer and said packings for preventing free flow of fluid from the interior of said equalizer to the exterior thereof, and means for applying pressure to said packings through said equalizer and said means.

16. In combination, a casing having an annular recess, an annular plunger movable in said recess, inner and outer packings carried by said plunger, rings coacting with said packings, an imperforate annular flexible plate coacting directly with said rings, an annular equalizer ring having inner and outer flexible portions coacting with said plate, an element having an annular projection coacting with said equalizer ring between said flexible portions, and means for applying pressure to said element.

17. In combination, a casing having a recess, a plunger movable in said recess, packings carried by said plunger, equalizing mechanism coacting with said packings, a floating thrust ring, and means for applying pressure to said packings through said thrust ring and said mechanism.

18. In combination, a casing having a recess, a plunger movable in said recess, packings carried by said plunger, rings coacting with said packings, a flexible imperforate plate coacting with said rings, an equalizer ring coacting with said plate, an element having a local projection coacting with said equalizer ring, and a floating thrust ring coacting with said element.

In testimony whereof, the signatures of the inventors are affixed hereto.

GEO. D. BECKER.
RAY C. NEWHOUSE.

CERTIFICATE OF CORRECTION.

Patent No. 1,901,722. March 14, 1933.

GEORGE D. BECKER, ET AL.

It is hereby certified that error appears in the printed specification of the above numbered patent requiring correction as follows: Page 3, line 112, claim 6, strike out the comma after "packings", and line 127, claim 8, for "coating" read "coacting"; and that the said Letters Patent should be read with these corrections therein that the same may conform to the record of the case in the Patent Office.

Signed and sealed this 16th day of May, A. D. 1933.

(Seal)

M. J. Moore.
Acting Commissioner of Patents.